(No Model.) 2 Sheets—Sheet 2.
J. PECKOVER.
MACHINE FOR SAWING STONE.
No. 390,034. Patented Sept. 25, 1888.
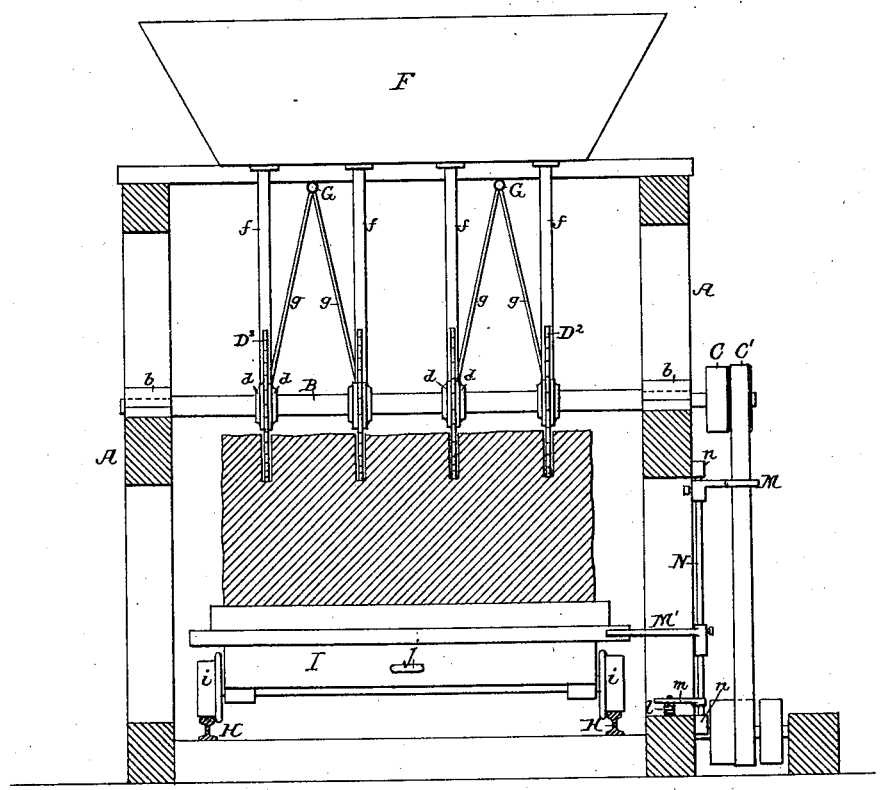
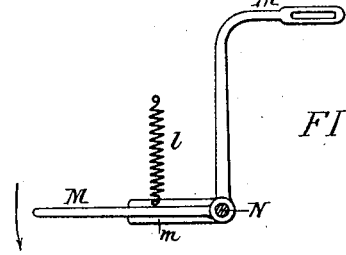
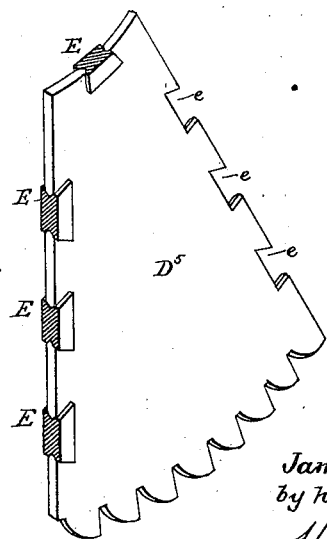
Witnesses:
Alex. Barkoff
Jno. E. Parker
Inventor:
James Peckover
by his Attorneys
Howson & Howson

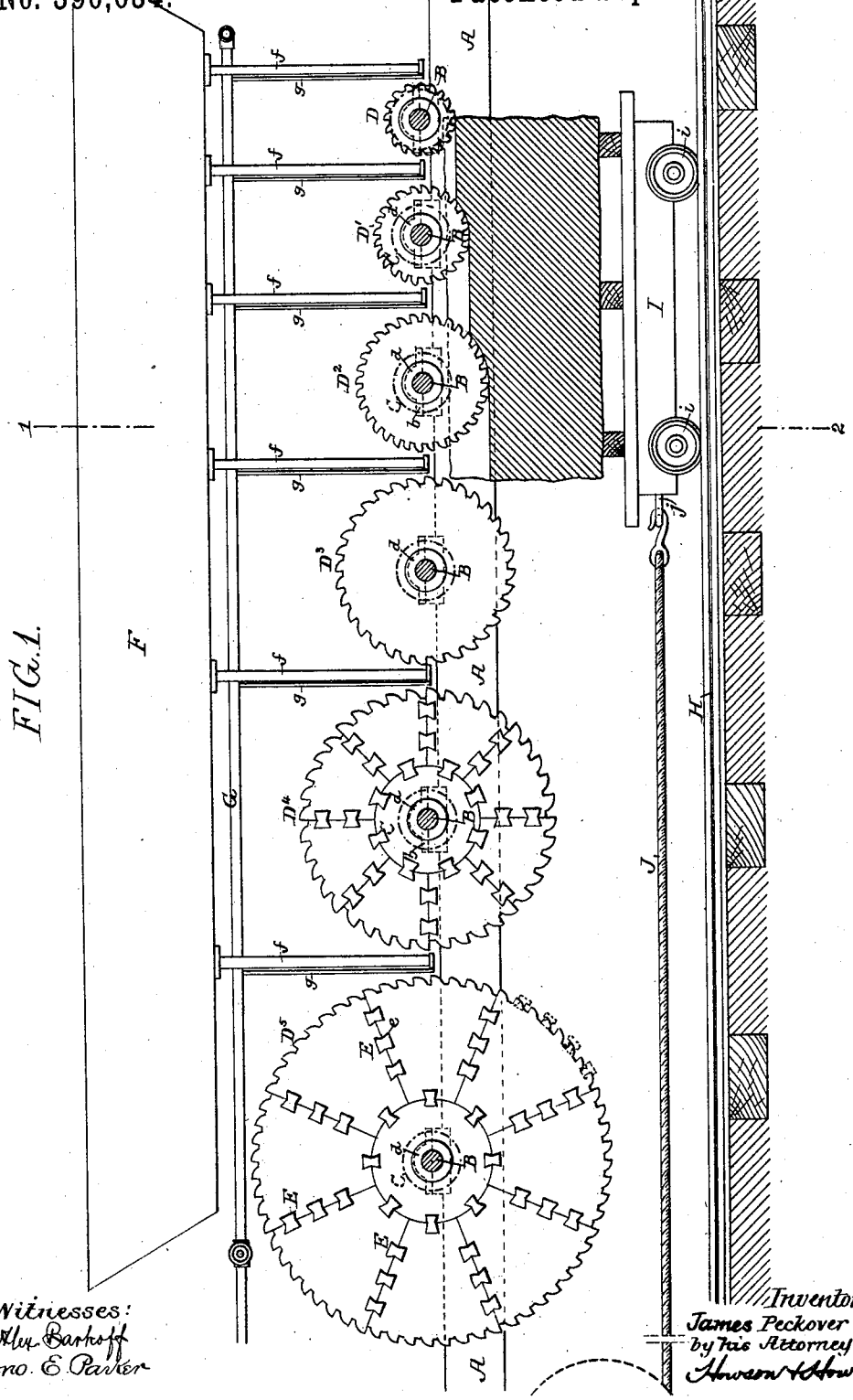

UNITED STATES PATENT OFFICE.

JAMES PECKOVER, OF PHILADELPHIA, PENNSYLVANIA.

MACHINE FOR SAWING STONE.

SPECIFICATION forming part of Letters Patent No. 390,034, dated September 25, 1888.

Application filed April 26, 1888. Serial No. 271,910. (No model.)

*To all whom it may concern:*

Be it known that I, JAMES PECKOVER, a subject of the Queen of Great Britain and Ireland, residing at Philadelphia, Pennsylvania, have invented certain Improvements in Machines for Sawing Stone and other Material, of which the following is a specification.

The object of my invention is to facilitate the sawing of stone, and this object I attain by the use of a series of circular saws of different diameters, and so arranged that the saw of smallest diameter acts upon the stone first, and that of the largest diameter last, so that a kerf of gradually-increasing depth is formed as the stone is moved past the saws.

In the accompanying drawings, Figure 1 is a longitudinal section of my improved stone-sawing machine. Fig. 2 is a view, partly in elevation and partly in transverse section, on the line 1 2. Fig. 3 is a perspective view of part of one of the saw-blades, and Fig. 4 a diagram of the belt-shifting devices.

A is the fixed frame of the machine, on which are bearings $b$ for the saw-spindles B, six of which are shown in the present instance, although more or less than this may be used, if desired. These saw-spindles are constructed in the same manner as ordinary circular-saw spindles, and have clamp-washers $d$ for the saws $D\ D'\ D^2\ D^3\ D^4\ D^5$, and each of the spindles is driven by a belt passing over a belt-pulley, C, on one end of the spindle, all of the saws being driven at the same speed, or some at a higher speed than others, as circumstances require.

The smaller-sized saws I prefer to make in one piece, as shown; but the larger saws I make up of a series of segments or plates secured together by means of double dovetailed keys E fitting in dovetailed notches $e$ in the tapered faces of the segments, so that when two segments are placed together the keys E may be inserted in the dovetailed notches to hold the segments in place. The opposite beveled edges of the keys are preferably grooved and the edges of the notches in the segments tongued for adaptation thereto, as shown in Fig. 3, the keys being bent so that they can enter the notches, and being expanded so as to fill the notches, in a manner substantially similar to that set forth in my patent, No. 381,811, dated April 24, 1888, as a method of securing teeth to saw-blades.

The keys are thicker than the saw-blade, so as to form projections on each side of the blade, these projections, when the saw enters the kerf in the stone, tending to steady the saw in its movement, for it should be understood that the sand and water used in connection with the saws cause the formation of a kerf wider than the thickness of the saw-blade. The saws have curved teeth, which act with the curved faces in advance, so as to drive the sand or other abrading material forward and downward into the kerf, and thus insure the best cutting effect.

Mounted above the saws is a sand-trough, F, having tubes $f$, which lead in front of the saws, as shown in Fig. 1, and G is a water-supply pipe having a pendent tube, $g$, in front of each saw, this tube being so set in relation to the sand-tube that the water will feed the same to the kerf formed by the saw at the proper point.

Mounted on suitable rails, H H, on the base of the machine is a carriage or truck, I, having suitable wheels, $i\ i$. This truck is provided with a hook, $j$, in front, and a draft-rope, J, is attached to this hook and connected to any winding-engine, the drum of which is shown by dotted lines in Fig. 1, this engine being of any ordinary construction, or other mechanism—such as a hand-windlass—being used without departing from my invention.

On the truck I is mounted the stone to be sawed, the top of the stone being set a little above the cutting-edge of the first or smallest saw, D, of the series, as shown in Fig. 1. When the winding-engine is put in motion, therefore, the carriage I will be drawn slowly toward the saws and the first saw will cut a shallow kerf in the stone, the next saw deepening the kerf, the next saw cutting it still deeper, and so on, the last saw, $D^5$, of the series being preferably of such diameter as to finish the cutting of the kerf through the stone.

I have shown four saws mounted on each spindle; but it will be evident that more or less than four saws may be used on each spindle, depending upon the character of the work for which the machine is intended. In the present instance I provide the saw-spindles with fast and loose pulleys C C', and provide each pair of pulleys with a shipper, M, through which the driving-belt passes. Each shipper-lever is mounted on a vertical shaft, N, adapted to suitable bearings, n, on the frame of the machine, and this vertical shaft has near its lower end an arm, M', which projects into the path of the carriage I. A spring, l, acting upon an arm, m, tends to keep the parts in such position as to throw the belt upon the loose pulley C'; but when the arm M' is struck and moved by the carriage in the forward movement of the latter the belt will be shifted from the loose to the fast pulley.

The arm M' of each saw-spindle is so situated in respect to the carriage I that motion will be imparted to the saw just before it reaches that portion of the kerf in which it begins to cut, thus preventing the unnecessary loss of power which would be caused by driving non-working saws.

In place of the fast and loose pulleys and movable belt, a clutch of the ordinary construction may be used without departing from my invention.

The above-described mechanism may be used in sawing other material than stone—such as wood and metal—without departing from my invention, the saws in such case, however, being modified as required by the different character of the work to be performed.

It will be evident, also, that the stone may be fixed and the saw-carrying frame traversed in respect thereto without departing from my invention, although the construction shown in the drawings is preferred.

I claim as my invention—

1. The combination of a stone-carrier, a saw-carrier having a series of saws of different diameters mounted in line, one in advance of another, means for moving one of said carriers in respect to the other, and sand-feeders discharging into the kerf in advance of each saw of the series, all substantially as specified.

2. The combination, in a sectional circular saw, of a series of segments having dovetailed notches in their edges, with double dovetailed keys fitting in said notches, said keys being thicker than the blade of the saw, all substantially as and for the purpose set forth.

3. The combination of the stone-carrier, the saw-carrying frame having a series of saws of different diameters, stopping and starting mechanism for each saw-spindle, and a controlling-arm projecting into the path of the stone carrier, whereby as one carrier is traversed in respect to the other the saws will be successively set in motion, substantially as set forth.

In testimony whereof I have signed my name to this specification in the presence of two subscribing witnesses.

JAMES PECKOVER.

Witnesses:
WILLIAM D. CONNER,
HARRY SMITH.